United States Patent [19]

Kato et al.

[11] 3,918,089

[45] Nov. 4, 1975

[54] APPARATUS FOR ERASING MAGNETIC RECORDS OF THE SPIRAL SCANNING TYPE

[75] Inventors: Saburo Kato, Yokohama; Isao Yamada, Chigasaki, both of Japan

[73] Assignee: Ricoh Co., Ltd., Tokyo, Japan

[22] Filed: Oct. 21, 1974

[21] Appl. No.: 516,665

Related U.S. Application Data

[63] Continuation of Ser. No. 361,784, May 18, 1973, abandoned.

[30] Foreign Application Priority Data

May 26, 1972 Japan ............................... 47-52620

[52] U.S. Cl. .................. 360/66; 360/101; 360/105; 360/118; 360/119

[51] Int. Cl. ..... G11B 5/47; G11B 5/54; G11B 5/25

[58] Field of Search ......... 360/2, 101, 66, 118, 119, 360/105

[56] References Cited

UNITED STATES PATENTS

| | | | |
|---|---|---|---|
| 2,962,560 | 11/1960 | Folse | 360/66 |
| 3,337,690 | 8/1967 | Martin | 179/66 R |
| 3,723,668 | 3/1973 | Ritchey | 360/66 |
| 3,727,921 | 4/1973 | Kato | 360/101 |

*Primary Examiner*—Bernard Konick
*Assistant Examiner*—R. S. Tupper
*Attorney, Agent, or Firm*—Cooper, Dunham, Clark, Griffin & Moran

[57] ABSTRACT

A method wherein an eraser button is depressed when the magnetic head has moved on the magnetic surface of a magnetic sheet from the periphery thereof to its center while following a spiral track and the recording or reproducing operation has been completed, so as to move the magnetic head back to its starting position by retracing the spiral track in the reverse direction. An erasing current is passed to the magnetic head when it retraces the spiral track in the reverse direction so as to erase the recordings.

6 Claims, 7 Drawing Figures

APPARATUS FOR ERASING MAGNETIC RECORDS OF THE SPIRAL SCANNING TYPE

This is a continuation of application Ser. No. 361,784, filed May 18, 1973, now abandoned.

BACKGROUND OF THE INVENTION

This invention relates to methods of erasing magnetic recordings for magnetic recording and reproducing apparatus adapted magnetically to record and reproduce electric signals in a spiral track, and more particularly it is concerned with a method of the type described wherein the electric signals magnetically recorded in a spiral track on a magnetic sheet are erased by the magnetic head used for recording the signals.

Magnetic recording and reproducing apparatus adapted for magnetically recording and reproducing electric signals in a spiral track are constructed such that a magnetic head supported by a turntable moves in a spiral track on the magnetic surface of a fixed magnetic sheet for recording electric signals and reproducing the same.

The magnetic recording and reproducing apparatus of the type in which the magnetic recording medium, such as a magnetic sheet or magnetic tape, is not moved but fixed while the magnetic head is moved spirally to effect recording or reproduction of electric signals must use a very complex mechanism for moving the magnetic head as aforementioned. The apparatus of the prior art have no recording eraser device attached thereto. Thus, it has hitherto been required to use a special eraser device when it is desired to erase the recordings on a magnetic sheet.

Proposals have been made to attach an eraser device or eraser head to the magnetic recording and reproducing apparatus of the type described. However, the attempt to use an eraser head has failed to achieve satisfactory results. When such device is provided, it must be mounted anterior to the recording and reproducing head in the direction of its movement and it must move accurately in spiral movement. The mechanism which moves the recording and reproducing head and the eraser head in the same spiral movement from the periphery of the magnetic sheet toward its center is very complex in construction. Besides, the eraser head requires an electric circuit of its own in addition to the electric circuit required for the recording and reproducing head. This entails the need to provide switch means of complex construction for switching between three or four circuits, and raises the technical problem of how to obviate cross talk between the circuits and other problems.

The magnetic recording and reproducing apparatus of the type described which have no built-in eraser device are inconvenient to use. If provided with an eraser device, they would be able to function in the same manner as tape recorders.

SUMMARY OF THE INVENTION

This invention has as its object the provision of a method whereby a magnetic recording and reproducing apparatus adapted for magnetically recording and reproducing electric signals in a spiral track can be made to perform a demagnetization function by a simple mechanism.

In the apparatus of the type described, the magnetic head is always returned to its starting position when information is recorded and reproduced. In this case, if the turntable on which the magnetic head is mounted is moved in the reverse direction, the magnetic head will, in returning to the starting position, retrace in the reverse direction the spiral track it followed when the recordings were made. Thus, if an erasing current is passed to the magnetic head which functions as a recording and reproducing head, it will be possible to erase the recordings. The method according to the invention consists in passing an erasing current to the magnetic head to erase the recordings which are not needed any more by utilizing the fact that the magnetic head retraces, when it returns to the starting position, in the reverse direction the spiral track it followed when the recordings were made.

The method according to the invention enables the apparatus to perform the function of erasing recordings in addition to the function of recording and reproducing signals by additionally using a simple switch device. Thus, the invention permits a conventional recording and reproducing apparatus adapted for magnetically recording and reproducing electric signals in a spiral track to perform a demagnetization function by simple means.

DESCRIPTION OF A PREFERRED EMBODIMENT OF THE INVENTION

Figure 1:
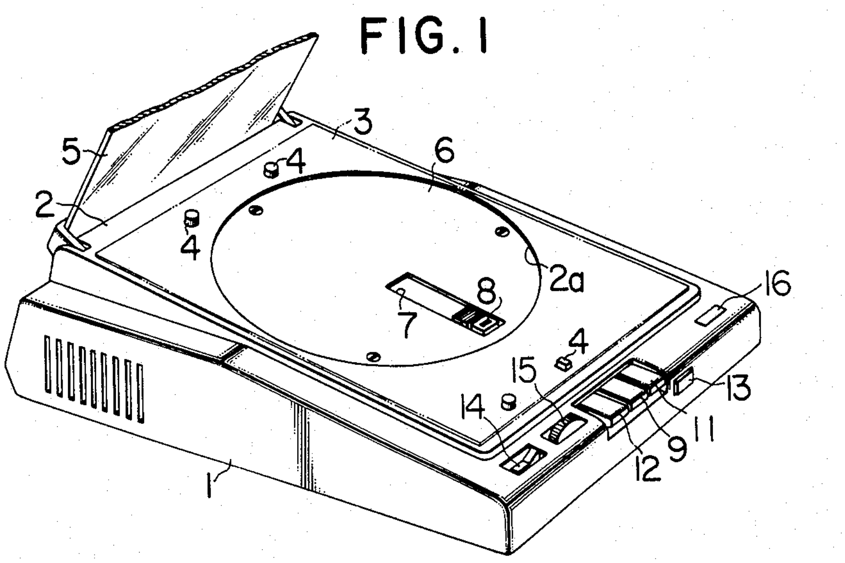
FIG. 1 is a perspective view of one example of magnetic recording and reproducing apparatus adapted for magnetically recording electric signals in a spiral track.

FIG. 1 shows an example of magnetic recording and reproducing apparatus of the spiral track type (with which the present invention may be practiced) which comprises a casing 1 including a top plate 2 on which a magnetic sheet 3 is adapted to be placed with its magnetic surface facing downwardly. Magnetic sheet 3 is correctly positioned on top plate 2 by three positioning pins 4 of a relatively small length.

A hold-down plate 5 made of a transparent material is hingedly connected at one end thereof to one end of casing 1 for keeping magnetic sheet 3 in position on top plate 2. Formed in top plate 2 is a large circular opening *2a* in which is disposed a style plate 6 formed substantially integrally with a turntable subsequently to be described. A radially oriented rectangular opening 7 is formed in style plate 6 for a magnetic head 8 mounted on a turntable 17 (see FIG. 2) to extend upwardly therethrough. Magnetic head 8, which is adapted to move as turntable 17 rotates, moves gradually toward the center of the turntable as a feed screw subsequently to be described is actuated. Thus, magnetic head 8 moves from the periphery of turntable 17 to the center thereof while following a spiral track as the turntable rotates. Information converted into electric signals is magnetically recorded on the magnetic sheet in a spiral track and reproduced therefrom as magnetic head 8 moves on magnetic sheet 3 while being maintained in contact with its magnetic surface.

Starting and temporarily stopping the rotation of the turntable in the playback operation is effected by operating a reproducing button 9, rapid movement of turntable 17 is made possible by operating a rapid movement button 11, and reverse movement thereof is made possible by operating a reverse movement button 12. A recording button 13 and reproducing button 9 are both operated when a recording operation is performed. When these buttons are depressed, recording, reproduction, rapid movement of the turntable and reverse movement of the turntable are effected by respective mechanisms (not shown). The numeral 14 designates a power source switch, 15 a volume control switch, and 16 a counter for indicating the number of revolutions of the turntable.

Figure 2:
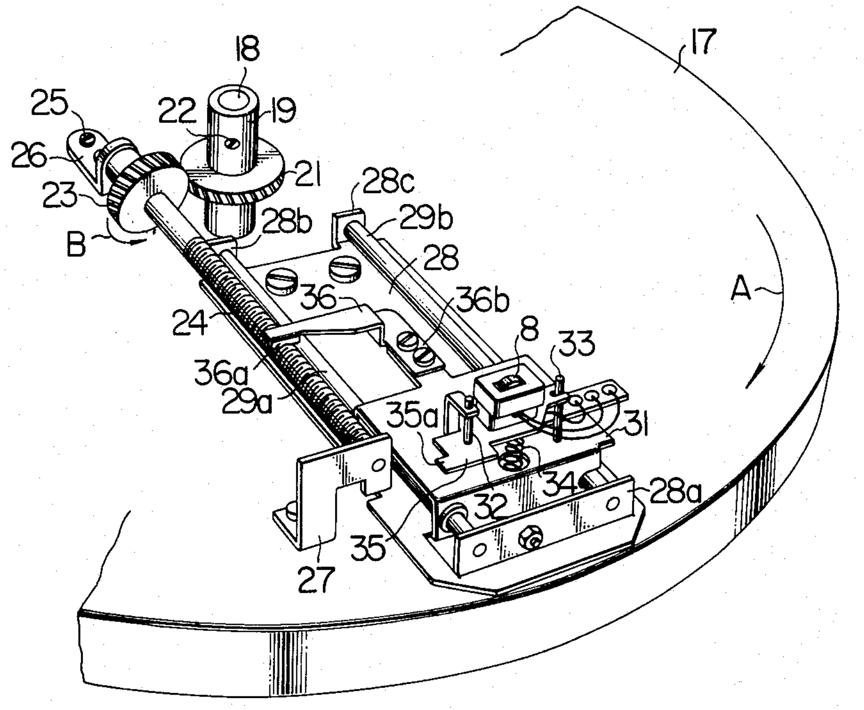
FIG. 2 is a perspective view of the mechanism for spirally moving the magnetic head means.

The turntable 17 (on which style plate 6 is mounted integrally) is rotatably supported, as shown in FIG. 2, by an upstanding shaft 18 which is secured at its base to a main mounting plate (not shown). Shaft 18 has secured thereto by a screw 22 a cylindrical body 19 which is substantially integral with a helical gear 21 maintained in meshing engagement with another helical gear 23 mounted on a feed screw 24 supported at one end by a supporter 26 secured by a screw 25 to turntable 17 and at the other end by a supporter 27. Thus, feed screw 24 is disposed parallel to the horizontal surface of turntable 17.

Turntable 17 is adapted to be rotated in the direction of an arrow A by a drive (not shown). As turntable 17 rotates, helical gear 23 rotates in the direction of an arrow B.

A guide rod **29*a* is interposed between an upstanding portion 28*a* of a supporter secured to turntable 17 and an upwardly bent portion 28*b* thereof while another guide rod 29*b* is interposed between upstanding portion 28*a* and another upwardly bent portion 28*c*. Mounted on the two guide rods 29*a* and 29*b* is a movable table 31 having two upstanding guide rods 32 and 33 secured thereto. An elevatory plate 35 having magnetic head 8 secured thereto is formed with two openings for loosely receiving therein upstanding guide rods 32 and 33. Mounted between elevatory plate 35 and movable table 31 is an expansion coil spring 34 which normally urges elevatory plate 35 to move upwardly by its biasing force. The upward movement of elevatory plate 35 is precluded by one end 35*a* of elevatory plate 35** positioned against an adjusting lever (not shown).

An engaging arm 36 in the shape of a letter L as seen from above and formed with a knife edge **36*a* at its free end is secured at its base to movable table 31. The knife edge 36*a* of engaging arm 36 is maintained in engagement with feed screw 24. As turntable 17 rotates in the direction of arrow A, feed screw 24 rotates in the direction of arrow B together with helical gear 23. As a result, rotation of feed screw 24 gradually moves movable table 31 radially of the turntable through knife edge 36*a*. Thus, magnetic head 8 moves from the periphery of the turntable to the center thereof while following a spiral track as turntable 17** rotates.

Magnetic head 8 is moved in a spiral track in this way, so that electric signals can be recorded or reproduced on the magnetic surface of magnetic sheet 3. The spiral track traced by magnetic head 8 on the magnetic surface of magnetic sheet 3 has a width of 0.8 millimeter, and the spacing between convolutions of the spiral track is 0.45 millimeter, so that one pitch of the track is 1.25 millimeters. The magnetic head scans the magnetic surface of the magnetic sheet and makes about thirty rounds while the turntable makes 30 revolutions. One revolution of the turntable takes about eight seconds, so that recording or playback of electric signals on the magnetic surface of magnetic sheet 3 takes about four minutes.

Figure 3:
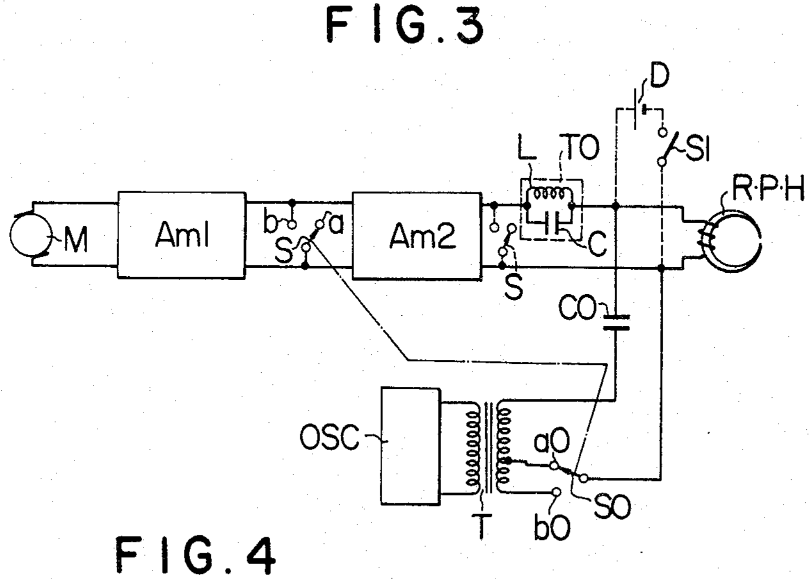
FIG. 3 is a block diagram of one example of the electric circuit used for recording electric signals and erasing recordings according to the invention.

FIG. 3 is a block diagram of one example of the electric circuit used for recording electric signals and erasing recordings in an illustrative embodiment of the present invention. In recording electric signals, the output of a microphone M is amplified by an amplifier A*m*1, and supplied to a recording and playback head R.P.H. through a trap circuit To after being further amplified by another amplifier A*m*2. An AC bias is applied to the recording and playback head R.P.H. from an oscillator OSC through a transformer T. Mounted on the secondary side of transformer T is a switch So which permits a suitable bias current to be passed to the recording and playback head R.P.H. when switch So is brought into engagement with a contact *ao*. When switch So is brought into engagement with a contact *bo*, the output of the oscillator OSC is increased in power such that the bias current passed to the recording and playback head R.P.H. is increased in value to a level high enough to erase the electric signals recorded previously.

Switch Sois operatively connected to a switch S interposed between the two amplifiers A*m*1 and A*m*2. If switch S*o* is brought into engagement with contact *ao* in recording electric signals, switch S will be brought into engagement with a contact *a;* if switch S*o* is brought into engagement with contact *bo*, switch S will be brought into contact with another contact *b*. Switches S and S*o* are actuated and brought into engagement with contacts *b* and *bo* respectively simultaneously as a switch (not shown) for reversing the rotation of a motor is actuated by depressing a reverse rotation button 12 (see FIG. 1). When a recording button 13 (see FIG. 1) alone is depressed, switches S and S*o* are brought into engagement with contacts *a* and *ao* respectively.

The trap circuit which comprises a capacitor C and a coil L is intended to preclude the influence exerted by the bias current on the amplifier when electric signals are recorded.

If the recording button 13 is depressed when it is desired to record electric signals, switches S and S1 will be brought into engagement with contacts *a* and *ao* respectively, and the output of microphone M will be supplied through amplifiers A*m*1 and A*m*2 to the recording and playback head R.P.H. to which a bias current is passed, so that it is recorded in a spiral track on the magnetic sheet.

When it is desired to erase the recordings, reverse rotation button 12 as well as recording button 13 is depressed. This brings switch S into engagement with contact *b* so that the output of amplifier A*m*1 or the output of microphone M is short-circuited. At the same time, switch S*o* is brought into engagement with contact *bo*, so that the bias current is increased in value to a level high enough to erase the signals recorded. The motor rotates in the reverse direction, and the recording and playback head R.P.H. functioning as an erasing head retraces the spiral track in the reverse direction in returning to its starting position. In this process, the recordings made in the spiral track are erased.

In the aforementioned electric circuit, switch S is interposed (as shown) between the two amplifiers A*m*1 and A*m*2. It is to be understood, however, that the switch can be interposed between amplifier A*m*2 and trap circuit T*o*.

Also, in the aforementioned electric circuit, the output of oscillator OSC is increased in power to increase the value of the bias current passed to the recording and playback head R.P.H. so that the bias current may serve as an erasing current. It is to be understood, however, that a switch S1 replacing switch S*o* and a direct current power source D may be interposed as shown in dash-and-dot lines between two terminals of the recording and playback head R.P.H. to erase the recordings by passing a DC current to the head.

Thus, according to the invention, the recordings on the magnetic sheet can be completely erased by moving the magnetic head from the center of the magnetic sheet to the periphery thereof along the spiral track which it had formed in recording electric signals and by passing an erasing current to the head during its reverse movement.

The invention has been described as requiring depression of both the recording button and the reverse rotation button to rotate the motor in the reverse direction and to pass an erasing current to the recording and playback head. It is to be understood, however, that an erasing button may be provided for passing an erasing current to the magnetic head and rotating the motor in the reverse direction when the button is depressed.

Figure 4:
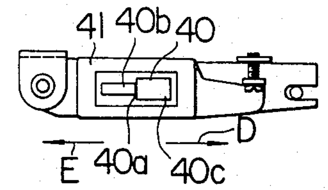
FIG. 4 is a plan view of one example of the magnetic head means used in the invention.
Figure 5:
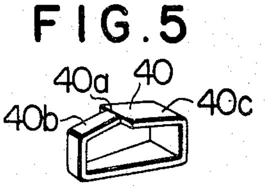
FIG. 5 is a perspective view of the core removed from the magnetic head means shown in FIG. 4.

Generally, it is known to increase the width of an erasing head over and above the width of a recording head in order that the erasing head may fully retrace the spiral track to erase recordings. To meet this requirement, the magnetic head has only to be constructed as shown in FIG. 4 which shows that portions of a core on opposite sides of a gap differ from each other in width. More specifically, as shown in FIG. 5, a left portion 40*b* of a core 40 has a smaller width than a right portion 40*c* thereof with a gap 40*a* being interposed therebetween. Thus, a spiral track formed by the left portion of the core of the magnetic head is smaller than the width of the right portion of the core which serves to erase the recordings, so that the recordings can be erased completely. The core constructed as aforementioned is mounted in a core housing.

Generally, it is known that the width of a track formed on a magnetic recording medium is determined by the width of a leading end portion of the core which slides on the medium. The magnetic head constructed as aforementioned has only to be moved in the direction of an arrow E in FIG. 4 when recording or playback is effected and in the direction of an arrow D when it is desired to erase the recordings.

Figure 6:
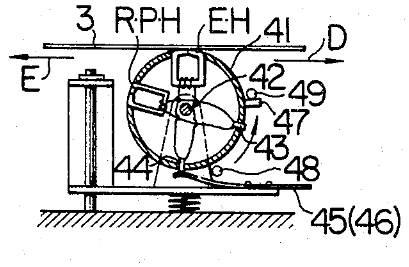
FIG. 6 is a sectional view of another example of the magnetic head means used in the invention.
Figure 7:
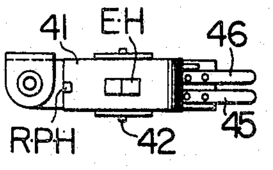
FIG. 7 is a plan view of the head means of FIG. 6.

The magnetic head means may be constructed as shown in FIG. 6 and FIG. 7. As shown, the head housing 41 is formed in the shape of a short cylinder and rotatably supported by a shaft 42 extending through the center thereof. The core housing 41 has an erasing head E.H. of a major width and a recording and playback head R.P.H. of a minor width built therein. Coils wound on heads E.H. and R.P.H. are connected to contacts 43 and 44, respectively, one of which is adapted to be brought into engagement with sliding brush 45 or 46. That is, when recording and playback head R.P.H. is in engagement with the magnetic surface of magnetic sheet 3, contact 43 is brought into engagement with sliding brush 45 to supply a recording current or a playback current to the coil; when erasing head E.H. is in engagement with the magnetic surface of magnetic sheet 3, contact 44 is brought into engagement with sliding brush 46 to supply an erasing current to the coil.

If the magnetic head means is constructed as aforementioned, the movement of the magnetic head means in the direction of an arrow D as shown in FIG. 6 will cause the cylindrical housing 41 in engagement with the magnetic surface of magnetic sheet 3 to rotate counterclockwise about shaft 42, so that erasing head E.H. will be brought to a position in which it is capable of engaging the magnetic surface. Erasing head E.H. is brought into engagement with the magnetic surface when a pin 47 projecting from cylindrical housing 41 abuts against a stop 49, and an erasing current is passed to the erasing head to cause the latter to effect de-magnetization.

If the magnetic head means is moved in the direction of an arrow E in FIG. 6 to effect recording, the cylindrical housing 41 maintained in engagement with the magnetic surface of magnetic sheet 3 will be caused by friction to rotate clockwise about shaft 42, so that recording and playback head R.P.H. will be brought to a position in which it is capable of engaging the magnetic surface of magnetic sheet 3. Pin 47 abuts against another stop 48, so that recording and playback head R.P.H. is brought into engagement with the magnetic surface. A recording current is passed to the head to cause the latter to effect recording.

It is to be understood that the invention is not limited to the features and embodiments hereinabove specifically set forth, but may be carried out in other ways without departure from its spirit.

What is claimed is:

1. Apparatus for magnetically recording and producing signals on a spiral track on a surface of a magnetic sheet, including a. means for retaining a magnetic sheet in a fixed position;
b. a magnetic transducer head;
c. means for selectively advancing said head in either of two directions along a spiral track on a surface of a magnetic sheet disposed in said fixed position;
d. signal circuit means energizing said head for recording on and reproducing from said magnetic sheet during movement of said head in a first of said two directions; and
e. manually operable means for reversing the direction of advance of said head along said spiral track;

wherein the improvement comprises f. selectively operable erase means energizing said head with an electric current of magnitude to erase signals recorded on said spiral track during movement of said head in the other of said two directions;
g. said head including a first gap-defining core means for tracing a spiral track of predetermined transverse width when said head is energized by said signal circuit means during advance in said first direction on said surface,
h. and said head further including a second gap-defining core means for tracing a spiral track coincident with but greater in transverse width than said last-mentioned spiral track when said head is energized by said erase means during advance in said other direction on said surface.

2. Apparatus as defined in claim 1, wherein said signal circuit means includes means for passing a bias current to said head during recording and said erase means passes an erasing current, higher in value than said bias current, to said head upon operation of said erase means.

3. Apparatus as defined in claim 1, wherein said erase means passes a direct electric current to said head.

4. Apparatus as defined in claim 1, wherein said erase means is manually operably; and further including means operating concurrently therewith for short-circuiting said signal circuit means.

5. Apparatus as defined in claim 1, wherein said head comprises a core having a gap, and wherein said first and second gap-defining core means are respectively first and second opposed gap-defining edges of said core, said second edge being wider than said first edge as measured in a direction transverse to a track traced by said head.

6. Apparatus for magnetically recording and reproducing signals on a spiral track on a surface of a magnetic sheet, including a. means for retaining a magnetic sheet in a fixed position;

b. magnetic transducer head means for recording, reproducing and erasing signals on the sheet;

c. means for selectively advancing said head means in either of two directions along a spiral track on a surface of a magnetic sheet disposed in said fixed position;

d. signal circuit means energizing said head means for recording on and reproducing from said magnetic sheet during movement of said head in a first of said two directions; and e. manually operable means for reversing the direction of advance of said head means along said spiral track;

wherein the improvement comprises f. selectively operable erase means energizing said head means with an electric current of magnitude to erase signals recorded on said spiral track during movement of said head means in the other of said two directions;

g. said head means comprising means for tracing a spiral track of predetermined transverse width when energized by said signal circuit means and for tracing a spiral track coincident with but of greater transverse width than said last-mentioned spiral track when energized by said erase means;

h. said head means including i. a support, ii. means mounting said support for rotation about an axis oriented radially with respect to said spiral track, said mounting means positioning said support for contact with the magnetic sheet surface to cause the support to rotate, upon advance of the head means by the advancing means, in a direction determined by the direction of advance of the head means, said mounting means including means limiting rotation of the support at first and second angular positions to which the support rotates upon advance of the head means in said first direction and in said other direction, respectively, iii. first and second cores, respectively defining a first gap and a second gap wider than the first gap, carried on said support and disposed to be respectively juxtaposed with said surface when said support is at said first and second angular positions, such that said first core engages said surface during movement of said head means in said first direction and said second core engages said surface during movement of said head means in said other direction, and iv. connecting means for respectively connecting said first core to said signal circuit means and said second core to said erase means.

* * * * *